US012793566B2

(12) United States Patent
Tan

(10) Patent No.: US 12,793,566 B2
(45) Date of Patent: Nov. 10, 2026

(54) METHOD OF GENERATING CONTENT BASED ON LARGE MODEL, ELECTRONIC DEVICE, AND STORAGE MEDIUM

(71) Applicant: Beijing Baidu Netcom Science Technology Co., Ltd., Beijing (CN)

(72) Inventor: Wentao Tan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/979,058

(22) Filed: Dec. 12, 2024

(65) Prior Publication Data

US 2025/0111796 A1 Apr. 3, 2025

(30) Foreign Application Priority Data

Sep. 14, 2024 (CN) ......................... 202411296294.7

(51) Int. Cl.

| | |
|---|---|
| ***G09B 5/06*** | (2006.01) |
| ***G06T 13/20*** | (2011.01) |
| ***G06T 13/40*** | (2011.01) |
| ***G09B 11/10*** | (2006.01) |
| ***G10L 13/02*** | (2013.01) |
| ***G10L 15/18*** | (2013.01) |
| ***G10L 15/183*** | (2013.01) |
| ***G10L 15/22*** | (2006.01) |

(52) U.S. Cl.
CPC ............ *G09B 5/065* (2013.01); *G06T 13/205* (2013.01); *G06T 13/40* (2013.01); *G09B 11/10* (2013.01); *G10L 13/02* (2013.01); *G10L 15/1815* (2013.01); *G10L 15/183* (2013.01); *G10L 15/22* (2013.01)

(58) Field of Classification Search
CPC ............................ G09B 11/10; G06F 16/2455
See application file for complete search history.

(56) References Cited

U.S. PATENT DOCUMENTS

| | | | | |
|---|---|---|---|---|
| 11,308,716 | B1 * | 4/2022 | Richter | G06T 19/006 |
| 12,111,834 | B1 * | 10/2024 | Carbune | G06F 16/9038 |
| 2013/0004929 | A1 * | 1/2013 | Otwell | G09B 5/00 434/350 |
| 2014/0277654 | A1 * | 9/2014 | Reinhardt | G06F 3/165 700/94 |
| 2017/0147585 | A1 * | 5/2017 | Kleindienst | G06F 16/2455 |

(Continued)

*Primary Examiner* — Peter R Egloff
(74) *Attorney, Agent, or Firm* — HSML P.C.

(57) ABSTRACT

A method of generating a content based on a large model, an electronic device, and a storage medium are provided, which relate to a field of artificial intelligence technology, and in particular to fields of deep learning, natural language processing, computer vision, large models, etc. The method includes performing an intention recognition on an input information in response to receiving the input information; generating a painting knowledge text by invoking a multimodal large model based on an intention for painting knowledge acquisition in response to recognizing the intention for painting knowledge acquisition from the input information; generating a first driving voice and a first action instruction for driving a virtual character according to the painting knowledge text; and broadcasting the painting knowledge text by driving the virtual character according to the first driving voice and the first action instruction.

20 Claims, 7 Drawing Sheets

(56) References Cited

U.S. PATENT DOCUMENTS

| | | | | |
|---|---|---|---|---|
| 2017/0344899 | A1* | 11/2017 | Zimmerman | G06N 20/00 |
| 2022/0230370 | A1* | 7/2022 | Duffy | G06F 3/03545 |
| 2023/0008097 | A1* | 1/2023 | Holdman | G06T 15/20 |

* cited by examiner

METHOD OF GENERATING CONTENT BASED ON LARGE MODEL, ELECTRONIC DEVICE, AND STORAGE MEDIUM

CROSS-REFERENCE TO RELATED APPLICATION(S)

This application claims the benefit of Chinese Patent Application No. 202411296294.7 filed on Sep. 14, 2024, the whole disclosure of which is incorporated herein by reference.

TECHNICAL FIELD

The present disclosure relates to a field of artificial intelligence technology, in particular to fields of deep learning, natural language processing, computer vision, large models, etc., and specifically to a method of generating a content based on a large model, an electronic device, and a storage medium.

BACKGROUND

The current online art teaching system products are passive, manual and single-interface in usage or interaction for art teachers and art students.

SUMMARY

The present disclosure provides a method of generating a content based on a large model, an electronic device, and a storage medium.

According to an aspect, a method of generating a content based on a large model is provided, including: performing an intention recognition on an input information in response to receiving the input information; generating a painting knowledge text by invoking a multimodal large model based on an intention for painting knowledge acquisition in response to recognizing the intention for painting knowledge acquisition from the input information; generating a first driving voice and a first action instruction for driving a virtual character according to the painting knowledge text; and broadcasting the painting knowledge text by driving the virtual character according to the first driving voice and the first action instruction.

According to another aspect of the present disclosure, an electronic device is provided, including: at least one processor; and a memory communicatively connected with the at least one processor; where the memory stores instructions executable by the at least one processor, and the instructions, when executed by the at least one processor, cause the at least one processor to perform the method provided by the present disclosure.

According to another aspect of the present disclosure, a non-transitory computer-readable storage medium storing computer instructions is provided, where the computer instructions are configured to cause a computer to perform the method provided by the present disclosure.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solutions, and do not constitute a limitation to the present disclosure. In the drawings.

DETAILED DESCRIPTION OF EMBODIMENTS

Hereinafter, exemplary embodiments of the present disclosure will be described with reference to the drawings, which include various details of the embodiments of the present disclosure to aid in understanding, and the embodiments should be regarded as exemplary only. Therefore, those skilled in the art should recognize that various changes and modifications may be made to the embodiments described herein without departing from the scope and spirit of the disclosure. Similarly, for clarity and conciseness, descriptions of well-known functions and structures have been omitted in the following description.

At present, the explanation of art painting teaching is either a live broadcast of an explanation video of a designated work recorded in advance by the teacher (such as a video of the key points, steps and techniques of sketching a cube), or a live video of online explanation of the teacher to explain to students the key points, steps, and details of the current teaching work. For example, if an art sketching teacher wants to teach a sketching course, the teacher must see what existing explanation videos are available in the current teaching system, or what explanation cases has prepared. The teacher may not do flexible teaching or on-demand teaching, which is very unfavorable to arouse the learning interest and learning desire of students.

At present, art painting comments are basically made by teacher one by one after students submit the homework, which is inefficient. The teacher must check every key point and detail of each teaching work one by one, which takes up a lot of time and energy of the art teacher.

In the technical solution of the present disclosure, the collection, storage, use, processing, transmission, provision, disclosure and application of the user personal information involved are in compliance with the provisions of relevant laws, and do not violate public order and good customs.

In the technical solution of the present disclosure, the authorization or consent of user is obtained before obtaining or collecting the personal information of user.

Figure 1:
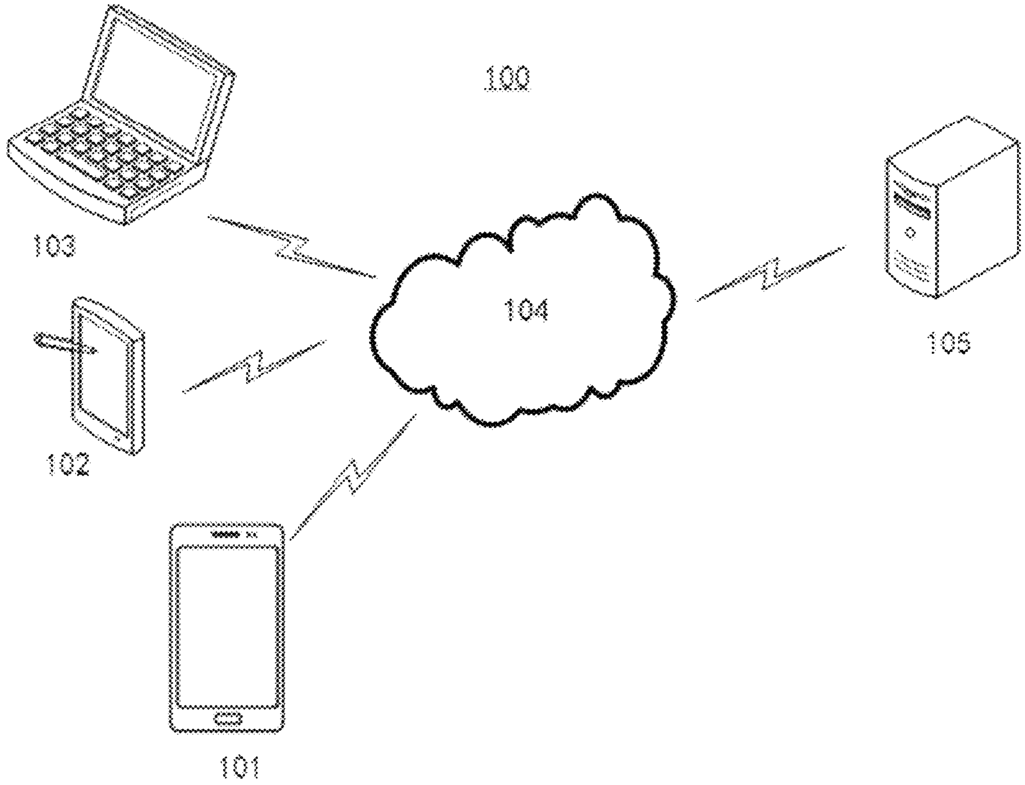
FIG. 1 is a schematic diagram of an exemplary system architecture in which a method and an apparatus of generating a content based on a large model may be applied according to an embodiment of the present disclosure.

FIG. 1 schematically shows an exemplary system architecture in which a method and an apparatus of generating a content based on a large model may be applied according to an embodiment of the present disclosure. It should be noted that FIG. 1 is only an example of a system architecture to which embodiments of the present disclosure may be applied, in order to help those skilled in the art understand the technical content of the present disclosure, but does not mean that embodiments of the present disclosure may not be used in other devices, systems, environments or scene.

As shown in FIG. 1, the system architecture 100 according to the embodiment may include terminal devices 101, 102, and 103, a network 104, and a server 105. The network 104 is used to provide a medium for a communication link between the terminal devices 101, 102, and 103 and the server 105. The network 104 may include various connection types, such as wired and/or wireless communication links, etc.

The terminal devices 101, 102, and 103 may be used by users to interact with the server 105 through the network 104 to receive or send messages, etc. The terminal devices 101, 102, and 103 may be various electronic devices, including but not limited to smart phones, tablet computers, laptop computers, etc.

The method of generating a content based on a large model provided by the embodiments of the present disclosure may generally be performed by the server 105. Correspondingly, the apparatus of generating a content based on a large model provided by the embodiments of the present disclosure may generally be provided in the server 105. The method of generating a content based on a large model provided by the embodiments of the present disclosure may also be performed by a server or server cluster that is different from the server 105 and may communicate with the terminal devices 101, 102, and 103 and/or the server 105. Correspondingly, the apparatus of generating a content based on a large model provided by the embodiments of the present disclosure may also be provided in a server or server cluster that is different from the server 105 and may communicate with the terminal devices 101, 102, and 103 and/or the server 105.

Figure 2:
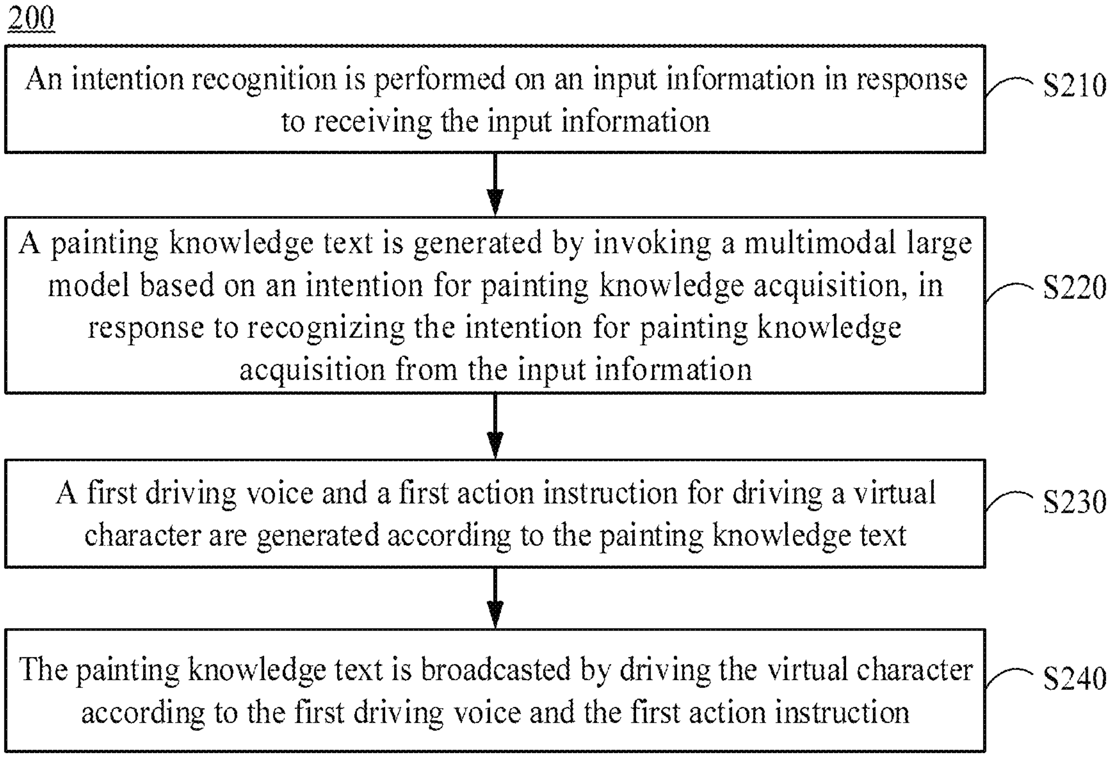
FIG. 2 is a flowchart of a method of generating a content based on a large model according to an embodiment of the present disclosure.

FIG. 2 is a flowchart of a method of generating a content based on a large model according to an embodiment of the present disclosure.

As shown in FIG. 2, the method of generating a content based on a large model includes operations S210 to S240.

In operation S210, an intention recognition is performed on an input information in response to receiving the input information.

For example, the input information may be text or voice input by a user (such as a trainee). If the input information is voice, the voice may be converted into input text, and the intention recognition may be performed on the input text.

The intention recognition may be performed on the input information by using a natural language processing model. The natural language processing model may be a text classifier that may classify the input text into a plurality of intentions. For example, the intentions may include an intention for painting knowledge acquisition, an intention for painting image generation, and an intention for painting knowledge retrieval, etc.

The intention for painting knowledge acquisition may be the intention of user to learn painting steps, painting techniques, etc., or the intention of user to comment on a painting work. In the case that the intention of user is to comment on a painting work, the input information further includes a painting work to be commented on input by the user.

In operation S220, a painting knowledge text is generated by invoking a multimodal large model based on an intention for painting knowledge acquisition, in response to recognizing the intention for painting knowledge acquisition from the input information.

For example, if the intention for painting knowledge acquisition of user is to learn painting steps or painting techniques, the input information may be sent to the multimodal large model, and the multimodal large model generates a painting teaching text containing painting steps or painting techniques.

If the intention for painting knowledge acquisition of user is to comment on the painting work, the painting work input by the user may be sent to the multimodal large model, and the multimodal large model generates a comment description text of the painting work.

The multimodal large model may include a generative large language model, an image content understanding model, etc. The generative large model is used to describe the components of the object that may be learned from the data through various machine learning methods, and then generate new and completely original content, such as text, pictures, videos, etc., which may help people generate various contents including text, pictures, videos, and 3D images on a large scale at a relatively low cost.

The image content understanding model is one of the artificial intelligence multimodal large models, which aims to improve the performance of image understanding, image semantic generation and dialogue generation by using larger multimodal (image-text) training data and more complex model structures. This type of model performs well in tasks and scenes of image content understanding and question answering of image content, and may help people better understand images and generate natural language based on images.

In the embodiments of the present disclosure, the knowledge required for painting, the required painting steps and skills, and the historical painting case data may be input into the multimodal large model, and a multimodal painting image understanding large model with the same reasoning ability as a professional painting teacher may be trained through fine-tuning.

In operation S230, a first driving voice and a first action instruction for driving a virtual character are generated according to the painting knowledge text.

For the painting teaching text or painting comment text generated by the multimodal large model, the virtual character may be driven to express, thereby implementing a "painting assistant" or "painting teaching assistant". The virtual character may be, for example, a digital human.

For example, the painting knowledge text (painting teaching text or painting comment text) may be converted into a voice (first driving voice), and the first driving voice is used to drive the virtual character to broadcast the painting knowledge text. Expressions, gestures and other action instructions may also be extracted from the painting knowledge text, and the action instructions are used to drive the virtual character to produce corresponding expressions and gestures and other body movements.

In operation S240, the painting knowledge text is broadcasted by driving the virtual character according to the first driving voice and the first action instruction.

After obtaining the first driving voice and the first action instruction, the virtual character may be driven to broadcast the painting knowledge text based on the first driving voice and the first action instruction. In the process of the virtual character broadcasting the painting knowledge text, the virtual character generates expressions and body movements corresponding to the painting knowledge text, which causes the expression of the virtual character more natural and real.

In the embodiments of the present disclosure, the intention recognition is performed on the input information, and when the intention for painting knowledge acquisition is recognized, the multimodal large model is invoked to generate the painting knowledge text corresponding to the painting knowledge demand. The virtual character is driven to broadcast the painting knowledge text, and generate corresponding expressions and actions during the broadcasting process. The virtual character may communicate with the user in a dialogue manner to implement the intelligent explanation of art teaching knowledge and the intelligent presentation of painting work comments.

In the field of art teaching, the embodiments of the present disclosure enable users to communicate with people through the "painting assistant" generated based on the art teaching knowledge base, multimodal large model and digital human. The digital human is driven to simulate the voice and expression of real people, so as to help users to complete the explanation of the painting steps or the explanation of the work comments, and output voice and results at the same time. Compared with conventional painting teaching methods, this embodiment may provide on-demand explanations and on-demand comments at any time.

Figure 3:
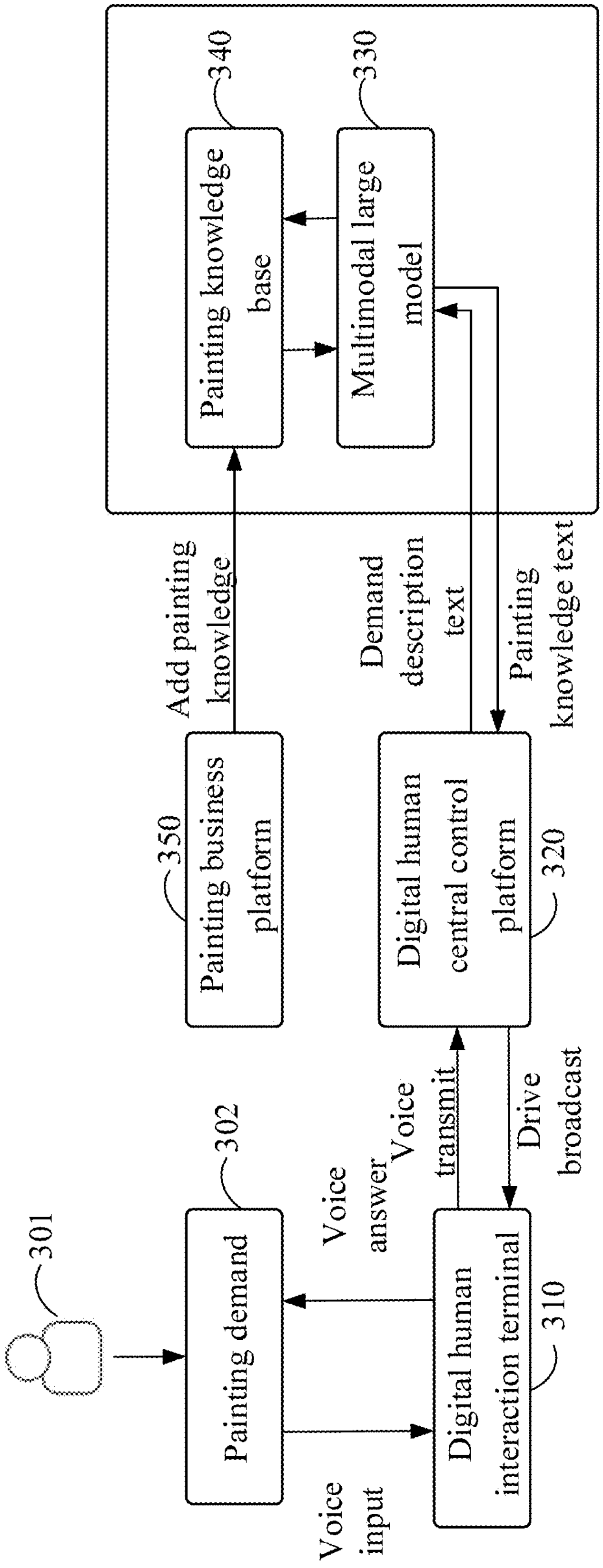
FIG. 3 is a schematic diagram of a system composition of a method of generating a content based on a large model according to an embodiment of the present disclosure.

FIG. 3 is a schematic diagram of a system composition of a method of generating a content based on a large model according to an embodiment of the present disclosure.

As shown in FIG. 3, the system of this embodiment includes a digital human interaction terminal 310, a digital human central control platform 320, a multimodal large model 330, a painting knowledge base 340, and a painting business platform 350. The painting business platform 350 may be used to provide users with an entry for uploading a painting knowledge. For example, users may upload professional teaching knowledge courses through the painting business platform 350. The painting knowledge base 340 may contain painting knowledge, painting skills, and painting steps of works covered by various courses. For example, in the sketching painting teaching scene, the painting knowledge base contains sketching course knowledge, basic art knowledge, sketching painting skills of each work, and sketching painting steps of each work.

A user 301 may be a person who has demand to learn painting, and the user 301 may interact with the teaching assistant digital human displayed by the digital human interaction terminal 310. For example, the user 301 may input a painting demand 302 by voice, and the painting demand 302 may include the demand to learn painting knowledge, the demand to comment on painting works, the demand to generate painting works, and the demand to retrieve painting knowledge. The digital human interaction terminal 310 sends the input voice to the digital human central control platform 320.

According to the embodiments of the present disclosure, the input voice is converted into an input text; and one of an intention for painting knowledge acquisition, an intention for painting image generation, and an intention for painting knowledge retrieval is recognized from the input text.

The digital human central control platform 320 may serve as the back end of the digital human interactive terminal 310, convert the input voice into text, that is, the demand description text, perform an intention recognition on the demand description text, and recognize that the intention of user is the intention for painting learning, the intention for painting comment, the intention for generating painting works, or the intention for retrieving painting knowledge.

The digital human central control platform 320 may also serve as a platform for coordinating and invoking the multimodal large model 330, and is used to select the corresponding multimodal large model according to different intentions and generate the corresponding painting knowledge text.

The multimodal large model 330 may be trained using the painting knowledge base 340, and the multimodal large model 330 with multiple abilities may be trained using the painting knowledge base 340. For example, by training with data such as art sketching course knowledge, basic art knowledge, sketching painting techniques of each work, and sketching painting steps of each work, a multimodal large model that has the ability to produce explanations of the painting steps and painting techniques for various sketching works, a multimodal large model that has the ability to produce painting comments for various works, and a multimodal large model that has the ability to produce painting works may be obtained.

Taking the sketching painting scene as an example, the training corpus of the multimodal large model 330 is the sketching painting knowledge base. The sketching painting knowledge may include a plurality of types, such as: geometric sketch, still life sketch, facial features sketch, portrait sketch, human body sketch, landscape sketch, etc. Therefore, the sketching painting scene may specifically include geometric sketching scene, still life sketching scene, facial features sketching scene, portrait sketching scene, human body sketching scene, and landscape sketching scene. Each painting scene has the basic painting knowledge, painting steps, painting skills, and other contents in the scene. For example, the demand description of learning sketching painting is used as a prompt, and the text content such as sketching painting steps, painting skills, and precautions in the sketching painting scene is used as a response, which constitutes the first type of training corpus. The first type of training corpus is used to fine-tune the large model, and the obtained multimodal large model may generate a response text of painting steps, painting skills, and precautions corresponding to the demand scene based on the sketching painting learning demand input by the user.

For another example, the specific steps of the sketching scene is used as a prompt, and the sketching image corresponding to the steps is used as a response, which constitutes the second type of training corpus. The second type of training corpus is used to perform fine-tuning training on the large model, and the obtained multimodal large model may generate a painting image corresponding to the painting steps input by the user.

For another example, a sketching image work is used as a prompt, and a comment description text of the work is used as a response, which constitutes the third type of training corpus. The third type of training corpus is used to fine-tune the large model, and the obtained multimodal large model may generate corresponding comment description text based on the painting work input by the user.

After the digital human central control platform 320 performs the intention recognition on the demand description text, if it recognizes that the intention of user is the intention for painting learning, a multimodal large model 330 with the ability to explain painting steps and painting techniques may be selected. The demand description text is sent to the multimodal large model 330 to generate an explanation text containing painting steps, painting techniques and precautions.

If the digital human central control platform 320 recognizes that the intention of user is the intention for painting comment, a multimodal large model 330 with the ability to comment on painting may be selected. The demand description text and the painting work is sent to the multimodal large model 330 to generate a comment description text for the painting work.

If the digital human central control platform 320 recognizes that the intention of user is the intention for painting image generation, the painting demand description text contains specific painting steps. A multimodal large model 330 with the ability to produce painting works may be selected, and the painting demand description text may be sent to the multimodal large model 330 to generate painting works corresponding to the painting steps contained in the painting demand description text.

If the digital human central control platform 320 recognizes that the intention of user is the intention for painting knowledge retrieval, a search engine may be invoked to retrieve the corresponding painting knowledge from the painting knowledge base 340, and a large model that has been fine-tuned and trained using the painting knowledge base is selected, such as a large language model, to summarize, generalize and organize the retrieved painting knowledge and reply in a dialogue.

Under the above-mentioned intention for painting learning, intention for painting comment, and intention for painting knowledge retrieval, the painting knowledge explanation text, painting comment text, and painting knowledge retrieval result generated by the multimodal large model 330 are all texts, which may be collectively referred to as painting knowledge text.

The painting knowledge text generated by the multimodal large model 330 may be sent to the digital human central control platform 320. The digital human central control platform 320 may convert the painting knowledge text into driving voice, extract action instructions such as expressions and gestures, and drive the digital human to broadcast the painting knowledge text based on the driving voice and action instructions, so that the art sketching large model may drive the digital human to communicate with the sketching students.

The embodiment of the present disclosure provides a new dialogue-based intelligent art auxiliary teaching solution for online art sketching teachers or students through a painting knowledge base, combined with a multimodal large model and digital human technology. The system assists art teaching in two ways. One way is "humanized intelligent explanation", which displays the digital human character of the sketching and painting teaching assistant on the front end, simulates the voice of a real person through voice synthesis technology, and drives the digital human to communicate with students through voice based on the art sketching teaching knowledge base and multimodal large model, so as to assist teaching staff in completing art teaching explanations. The second way is "humanized intelligent comment of sketching works", which inputs the sketching works (photos or scans of paintings) of students into the multimodal large model, and the "work comment report generation" of the work may be inferred and simulated through model training. Next, these signals are used to drive the digital human to present to the outside world, so that the students may be informed of the comments of their works in a timely manner in the form of a human report as a comment teacher.

Figure 4:
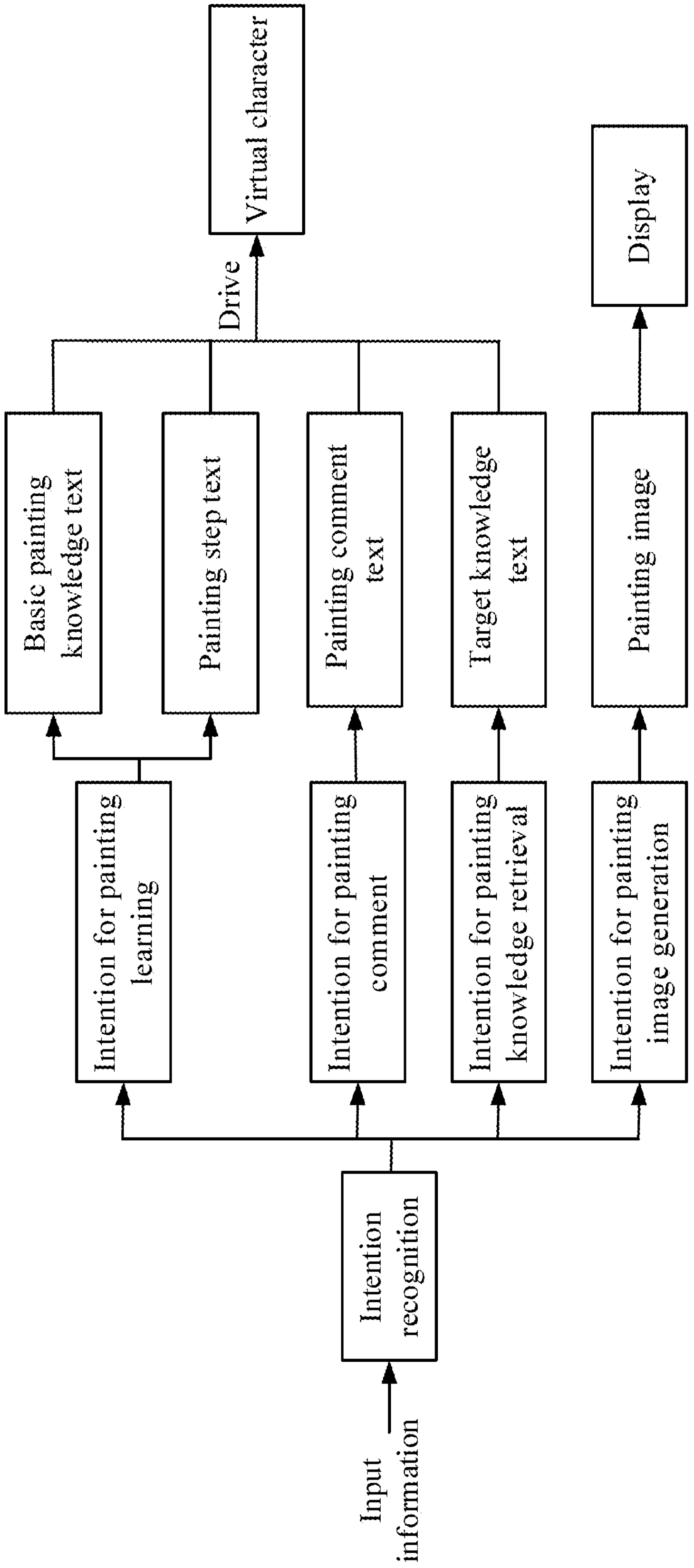
FIG. 4 is a schematic diagram of a method of generating a content based on a large model according to an embodiment of the present disclosure.

FIG. 4 is a schematic diagram of a method of generating a content based on a large model according to an embodiment of the present disclosure.

As shown in FIG. 4, an intention recognition is performed on an input information, and the intention of user is recognized as one of an intention for painting learning, an intention for painting comment, an intention for painting knowledge retrieval, and an intention for painting image generation.

According to the embodiments of the present disclosure, the generating a painting teaching text by invoking the painting teaching large model in response to the intention for painting knowledge acquisition being the intention for painting learning includes: analyzing the intention for painting learning, so as to determine that the intention for painting learning is one of a basic painting knowledge learning and a painting step learning; and generate one of a basic painting knowledge text and a painting step text by invoking the painting teaching large model according to one of the basic painting knowledge learning and the painting step learning.

In the case that the intention of user is the painting learn intention, a multimodal large model with the ability to explain basic painting knowledge and painting steps may be invoked to generate the basic painting knowledge text or the painting step text.

For example, the intention for painting learning may be further analyzed to determine whether the intention for painting learning of user is to learn the basic painting knowledge or painting steps. If the intention for painting learning of user is to learn the basic painting knowledge, it may be further determined of which scene the basic painting knowledge is to be learned, such as the basic art knowledge, a basic sketching knowledge, a basic geometric sketching knowledge, etc. The corresponding large model of basic painting knowledge may be invoked to generate the corresponding basic knowledge text according to the intention analysis result.

If the intention for painting learning of user is to learn painting steps, the large model of painting steps may be invoked to generate a painting step text, and the painting step text may include painting steps, and painting points, painting techniques and precautions in the steps.

According to the embodiments of the present disclosure, the generating a painting comment text by invoking the painting comment large model in response to the intention for painting knowledge acquisition being the intention for painting comment includes: sending the input information and the painting work to the painting comment large model; and commenting on the painting work by using the painting comment large model to obtain the painting comment text.

In the case that the intention of user is the intention for painting comment, the multimodal large model with the ability to comment on the painting may be invoked, and the comment intention description text and the painting work are sent to the large model, and the large model generates the painting comment text.

According to the embodiments of the present disclosure, the generating a painting image by invoking the multimodal large model based on the intention for painting image generation in response to recognizing the intention for painting image generation from the input information includes: sending the painting step information to the multimodal large model; and generating the painting image by using the multimodal large model based on the painting step information.

In the case that the intention of user is the intention for painting image generation, the input information includes the painting steps, and the multimodal large model with the ability to produce painting works may be invoked, and the description text of the intention for painting image generation and the painting step text are sent to the multimodal large model to generate the painting image corresponding to the painting steps.

According to the embodiments of the present disclosure, a target knowledge text is retrieved from a painting knowledge base, in response to recognizing the intention for painting knowledge retrieval from the input information; a second driving voice and a second action instruction for driving the virtual character are generated according to the target knowledge text; and the target knowledge text is broadcasted by driving the virtual character according to the second driving voice and the second action instruction.

In the case that the intention of user is the intention for painting knowledge retrieval, a search engine may be invoked to retrieve the corresponding target knowledge text from the painting knowledge base, and a large language model may be invoked to summarize and organize the corresponding target knowledge text, so as to output in the form of a dialogue.

The basic painting knowledge text, the painting step text, the painting comment text, and the target knowledge text generated under the intention for painting learning, the intention for painting comment, and the intention for painting knowledge retrieval may all be broadcasted and explained in the form of a digital human. For example, the above-mentioned text may be converted into a voice, an action instruction corresponding to the text is generated, and the digital human is driven to broadcast according to the voice and action instruction.

The painting image generated under the intention for painting image generation may be directly returned to the user terminal for display to the user.

According to the embodiments of the present disclosure, the digital human is driven based on the text generated by the large model, so as to achieve the purpose of providing an art teaching assistant similar to a real person. The assistant may help users provide painting steps and painting skill explanations for art sketching courses, painting steps and painting skill explanations for personalized sketching demands, art sketching courses or knowledge retrieval inquiries (language questions and language replies), art sketching work intelligent comments and comment report generation and other services, so as to achieve flexible teaching and on-demand teaching.

Figure 5:
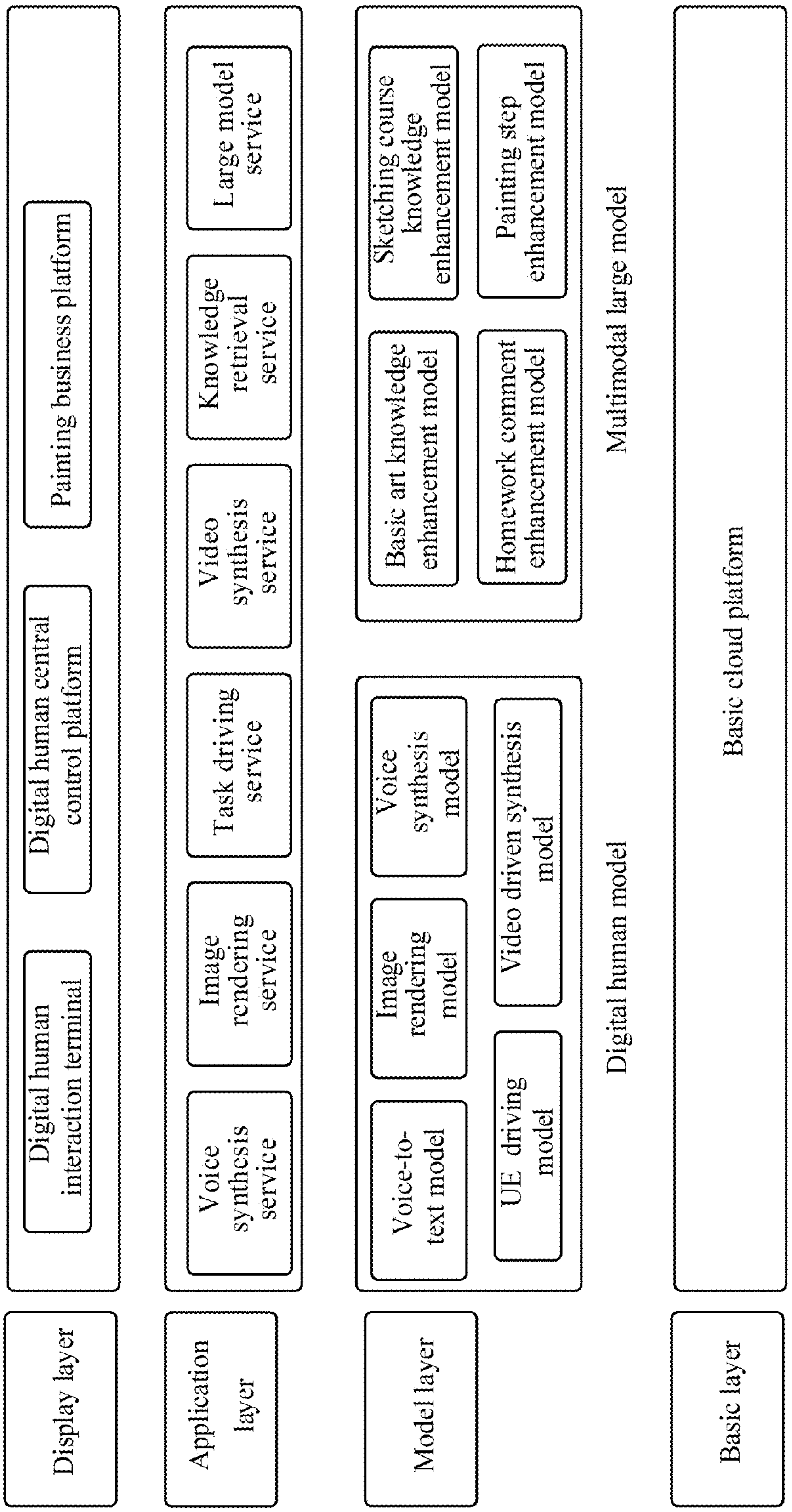
FIG. 5 is a schematic diagram of a system architecture of a method of generating a content based on a large model according to an embodiment of the present disclosure.

FIG. 5 is a schematic diagram of a system architecture of a method of generating a content based on a large model according to an embodiment of the present disclosure.

As shown in FIG. 5, the system architecture includes a basic layer, a model layer, an application layer, and a display layer. The basic layer is a basic cloud platform, and is responsible for providing basic hardware and operating system capability assurance.

The model layer includes a multimodal large model and a digital human model. The multimodal large model provides contextual responses and content generation for sketching teaching demand and comment demand. The multimodal large model may include a basic art knowledge enhancement model, a sketching course knowledge enhancement model, a homework comment enhancement model, and a painting step enhancement model. Each enhancement model may be obtained by fine-tuning the large model (including the language large model and the visual large model) using the corresponding training data. For example, the basic art knowledge enhancement model is obtained by fine-tuning the large model using the basic art knowledge. The enhancement model has the reasoning ability of basic art knowledge and may perform question answering of basic art knowledge. Other enhancement models are similar and will not be repeated here.

The digital human model layer provides digital human basic ability, and is a combination of a plurality of models, including voice-to-text model, image rendering model, voice synthesis model, UE (User Experience) driving model and video driving synthesis model. The voice-to-text model is used to convert voice into text. The image rendering model is used to render the digital human. The voice synthesis model is used to convert text into voice. The UE driving model is used to generate action instructions such as expressions and gestures based on text. The video driving synthesis model is used to store the broadcasting process of the digital human into a video.

The application layer provides a combined invoking function for digital human basic applications, which may coordinate and invoke the digital human model and the multimodal large model. The application layer includes voice synthesis service, image rendering service, task driving service, video synthesis service, knowledge retrieval service and large model service.

For example, the voice synthesis service is used to invoke the voice synthesis model to synthesize voice. The image rendering service is used to invoke the image rendering model to generate the digital human. The task-driven service is used to perform the intention recognition to determine the intention of user and generate a painting task based on the intention of user. The video synthesis service is used to invoke the video-driven synthesis model to generate a video. The knowledge retrieval service is used to retrieve the target knowledge from the sketching knowledge base. The large model service is used to invoke the multimodal large model to perform the painting task.

The display layer is used to enable the teaching assistant digital human to interact with the user through the terminal and the corresponding background management functions. The display layer includes the digital human interaction terminal, the digital human central control platform and the painting business platform. The digital human interaction terminal is used to receive the voice input of user and output the voice answer. The digital human central control platform is used to drive the digital human to communicate with the user. The painting business platform is used to provide the user with an entry to upload painting knowledge courses.

Figure 6:
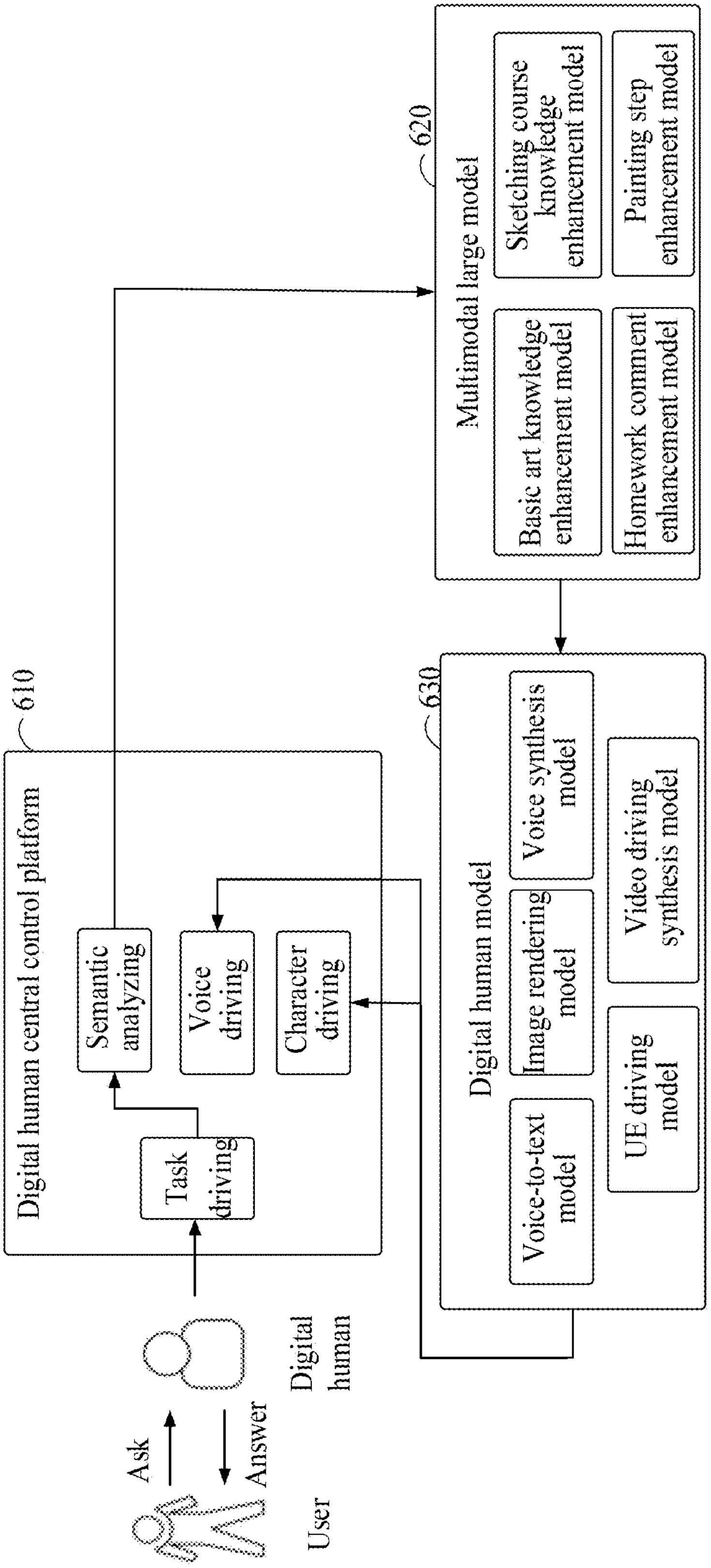
FIG. 6 is a schematic diagram of a system invoking interaction of a method of generating a content based on a large model according to an embodiment of the present disclosure.

FIG. 6 is a schematic diagram of a system invoking interaction of a method of generating a content based on a large model according to an embodiment of the present disclosure.

As shown in FIG. 6, this embodiment includes a digital human central control platform 610, a multimodal large model 620 and a digital human model 630. The digital human central control platform 610 includes a task driving module, a semantic analyzing module, a voice driving module and a character driving module. The multimodal large model 620 includes a voice-to-text model, an image rendering model, a voice synthesis model, a UE driving model and a video driving synthesis model. The voice-to-text model is used to convert voice into text. The image rendering model is used to render a digital human. The voice synthesis model is used to convert text into voice. The UE driving model is used to generate action instructions such as expressions and gestures based on text. The video driving synthesis model is used to store the broadcasting process of the digital human into a video. The multimodal large model 620 includes a basic art knowledge enhancement model, a sketching course knowledge enhancement model, a homework comment enhancement model and a painting step enhancement model.

The user interacts with the digital human displayed by the digital human interaction terminal. For example, the user asks a question to the digital human, and the digital human broadcasts the answer to the user. The question asked by the user is sent to the digital human central control platform 610 through the digital human interaction terminal. The task driving module perform the intention recognition of the question, determines whether the intention of user is the intention for painting learning, an intention for painting comment, an intention for painting image generation, or an intention for painting knowledge retrieval, and the corresponding painting task is generated based on the intention, such as the painting learning task, the painting comment task, the painting work generation task, and the painting knowledge retrieval task.

The semantic analyzing module is used to further analyze the painting task determined by the task driving module. For example, the painting learning task may be further analyzed into the basic art knowledge question-answering task, the sketching course knowledge question-answering task, the painting step explanation task, etc.

According to the painting task analyzed by the semantic analyzing module, the corresponding large model in the multimodal model 620 may be invoked to generate an answer. For example, the basic art knowledge enhancement model is invoked according to the basic art knowledge question-answering task. For the painting comment task, the homework comment enhancement model is invoked, etc.

The answer generated by the multimodal model may include the basic painting knowledge text, the painting step explanation text, etc. The answer text may be sent to the digital human model 630. The digital human model 630 generates and drives the digital human to broadcast the answer text based on the voice driving module and the character driving module to interact with the user.

In the embodiments of the present disclosure, the user consults about art sketching and painting problems through the terminal, the digital human generates a teaching assistant character and interacts with the user through the terminal, and the digital human central control platform is responsible for coordinating and invoking the multimodal large model. According to different business processing processes, the corresponding multimodal large model is coordinated for processing, which may improve the model processing efficiency and model processing effect.

The implementation of the digital human provided in the embodiment of the present disclosure is further explained below.

The digital human system may include a human character driving module, a voice generation module, an animation generation module, an audio and video synthesis display module, and an interaction module. The human character driving module is used to generate a human character. According to the dimension of human graphic resource, it may be divided into two categories of 2D and 3D. From the appearance, it may be divided into cartoon, anthropomorphic, realistic, hyper realistic and other styles. The voice generation module and the animation generation module may generate the corresponding human voice and the matching human animations based on text respectively. The audio and video synthesis display module synthesizes voice and animation into a video and then displays to the user. The interaction module enables the digital human to have interactive functions, that is, to recognize the intention of user through intelligent technologies such as voice semantic recognition, and determine the subsequent voice and action of the digital human according to the current intention of user, and drive the human to start the next round of interaction. For example, it determines whether the intention of user is a painting demand, if so, the painting demand text is sent to the multimodal large model, and a simple reply is returned to the user: for example, please wait a moment, and the specific steps of XX will be provided to you; if it is not a painting demand, it may reply according to the painting knowledge retrieval; or if the user input is a simple greeting, it may reply according to the configured words.

Figure 7:
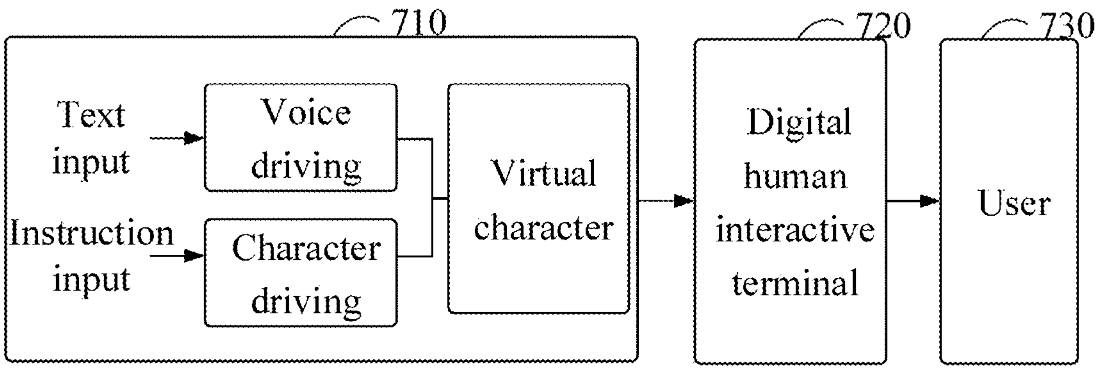
FIG. 7 is a system schematic diagram of a digital human interaction according to an embodiment of the present disclosure.

FIG. 7 is a system schematic diagram of a digital human interaction according to an embodiment of the present disclosure.

As shown in FIG. 7, this embodiment includes a digital human central control platform 710, a digital human interactive terminal 720, and a user 730. The digital human central control platform 710 includes a voice driving module and a character driving module.

The text input may refer to inputting the painting knowledge text generated by the multimodal large model or the target knowledge text obtained by retrieving into the voice driving module. The voice driving module may convert the input text into voice, and drive the virtual character to broadcast the input text based on the voice.

The instruction input may be to extract relevant features such as expressions and gestures from the input text and input into the character driving module. The character driving module generates action instructions based on these features, and drives the virtual character to generate corresponding actions according to the action instructions.

The above-mentioned voice driving module and character driving module jointly drive the generation of a virtual character digital human.

The digital human central control platform 710 may send the generated virtual character to the digital human interaction terminal 720, so as to be displayed on the digital human interaction terminal 720. The digital human displayed by the digital human interaction terminal 720 interacts with the user 730.

Figure 8:
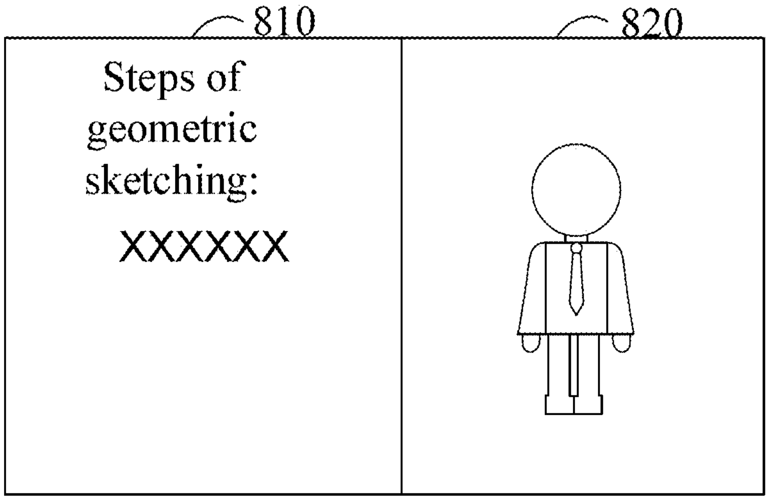
FIG. 8 is an effect schematic diagram of a digital human interaction according to an embodiment of the present disclosure

FIG. 8 is an effect schematic diagram of a digital human interaction according to an embodiment of the present disclosure.

As shown in FIG. 8, the interaction display effect of the digital human in this embodiment may be displayed on the digital human interactive terminal. For example, the digital human interactive terminal displays page 810 and page 820. Page 810 may display a painting knowledge text generated by a multimodal large model, such as the steps of geometric sketching. Page 820 displays a digital human, and the digital human may broadcast the text displayed in page 810 and generate corresponding body movements such as expressions and gestures during the broadcasting process.

According to the embodiments of the present disclosure, the present disclosure provides an apparatus of generating a content based on a large model.

Figure 9:
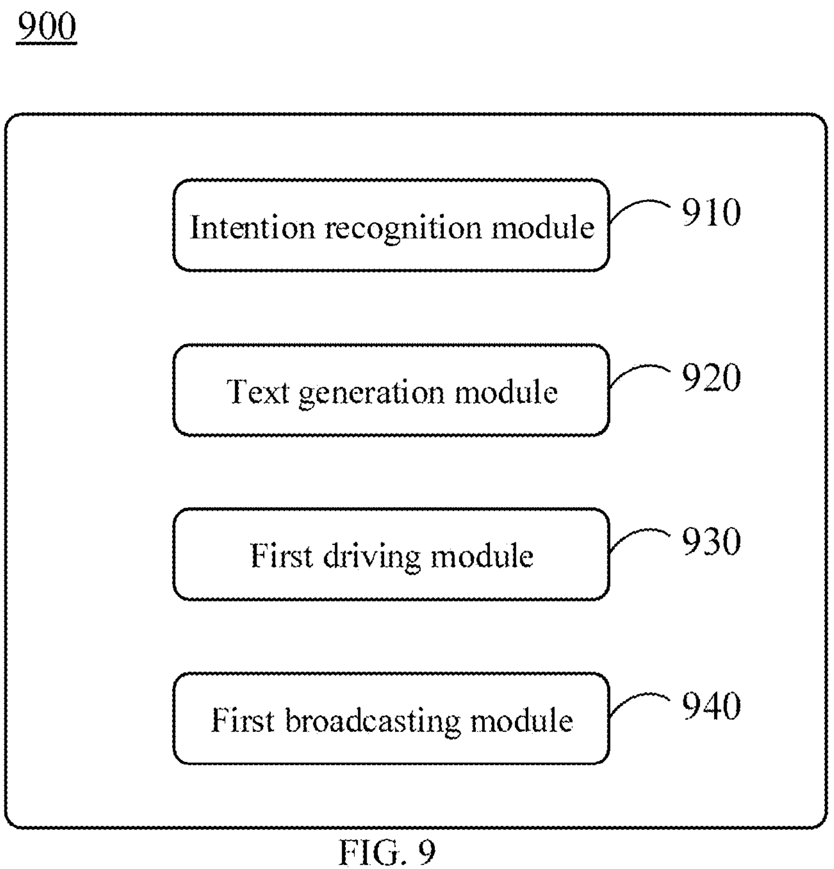
FIG. 9 is a block diagram of an apparatus of generating a content based on a large model according to an embodiment of the present disclosure.

FIG. 9 is a block diagram of an apparatus of generating a content based on a large model according to an embodiment of the present disclosure.

As shown in FIG. 9, the apparatus 900 of generating a content based on a large model includes an intention recognition module 910, a text generation module 920, a first driving module 930 and a first broadcasting module 940.

The intention recognition module 910 is configured to perform an intention recognition on an input information in response to receiving the input information.

The text generation module 920 is configured to generate a painting knowledge text by invoking a multimodal large model based on an intention for painting knowledge acquisition in response to recognizing the intention for painting knowledge acquisition from the input information.

The first driving module 930 is configured to generate a first driving voice and a first action instruction for driving a virtual character according to the painting knowledge text.

The first broadcasting module 940 is configured to broadcast the painting knowledge text by driving the virtual character according to the first driving voice and the first action instruction.

According to the embodiments of the present disclosure, the input information includes an input voice. The intention recognition module 910 includes a conversion unit and an intention recognition unit.

The conversion unit is configured to convert the input voice into an input text.

The intention recognition unit is configured to recognize one of the intention for painting knowledge acquisition, an intention for painting image generation, and an intention for painting knowledge retrieval from the input text.

The intention for painting knowledge acquisition includes an intention for painting learning and an intention for painting comment; and the multimodal large model includes at least one of a painting teaching large model and a painting comment large model. The text generation module 920 includes a teaching text generation unit and a comment text generation unit.

The teaching text generation unit is configured to generate a painting teaching text by invoking the painting teaching large model in response to the intention for painting knowledge acquisition being the intention for painting learning.

The comment text generation unit is configured to generate a painting comment text by invoking the painting comment large model in response to the intention for painting knowledge acquisition being the intention for painting comment.

The teaching text generation unit includes an analyzing sub-unit and a teaching text generation sub-unit.

The analyzing sub-unit is configured to analyze the intention for painting learning, so as to determine that the intention for painting learning is one of a basic painting knowledge learning and a painting step learning; and The teaching text generation sub-unit is configured to generate one of a basic painting knowledge text and a painting step text by invoking the painting teaching large model according to one of the basic painting knowledge learning and the painting step learning.

The input information includes a painting work. The comment text generation unit includes a sending sub-unit and a comment text generation sub-unit.

The sending sub-unit is configured to send the input information and the painting work to the painting comment large model.

The comment text generation sub-unit is configured to comment on the painting work by using the painting comment large model to obtain the painting comment text.

The apparatus 900 of generating a content based on a large model further includes a painting image generation module.

The painting image generation module is configured to generate a painting image by invoking the multimodal large model based on the intention for painting image generation in response to recognizing the intention for painting image generation from the input information.

The input information includes a painting step information. The painting image generation module includes a sending unit and a painting image generation unit.

The sending unit is configured to send the painting step information to the multimodal large model.

The painting image generation unit is configured to generate the painting image by using the multimodal large model based on the painting step information.

The apparatus 900 of generating a content based on a large model further includes a retrieving module, a second driving module and a second broadcasting module.

The retrieving module is configured to retrieve a target knowledge text from a painting knowledge base in response to recognizing the intention for painting knowledge retrieval from the input information.

The second driving module is configured to generate a second driving voice and a second action instruction for driving the virtual character according to the target knowledge text.

The second broadcasting module is configured to broadcast the target knowledge text by driving the virtual character according to the second driving voice and the second action instruction.

According to the embodiments of the present disclosure, the present disclosure also provides an electronic device, a readable storage medium and a computer program product.

Figure 10:
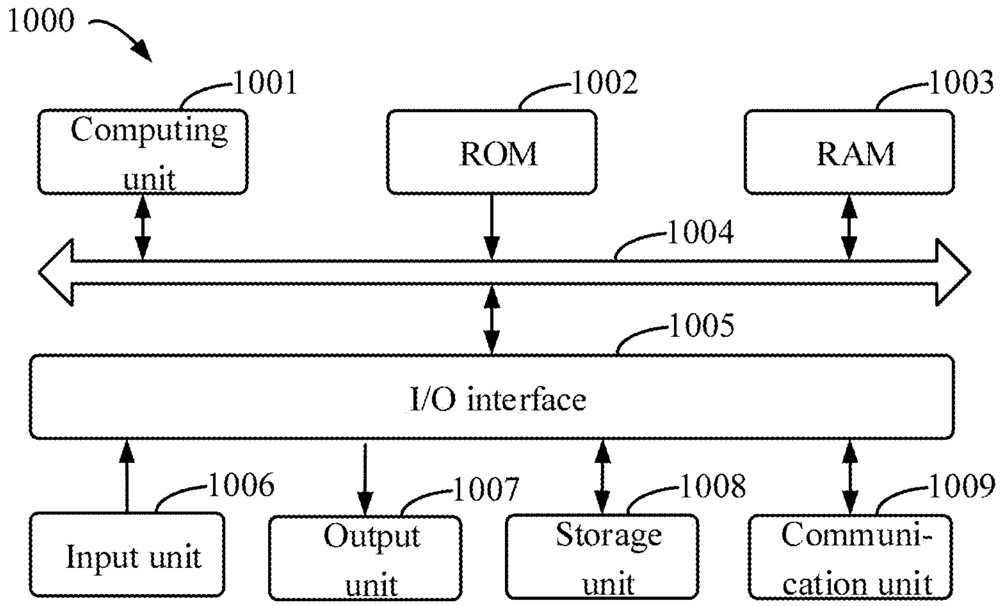
FIG. 10 is a block diagram of an electronic device for a method of generating a content based on a large model according to an embodiment of the present disclosure.

FIG. 10 shows a schematic block diagram of an example electronic device 1000 used to implement the embodiments of the present disclosure. The electronic device is intended to represent various forms of digital computers, such as laptop computers, desktop computers, workstations, personal digital assistants, servers, blade servers, mainframe computers and other suitable computers. The electronic device may also represent various forms of mobile devices, such as personal digital processing, cellular phones, smart phones, wearable devices and other similar computing devices. The components shown herein, their connections and relationships, and their functions are merely examples, and are not intended to limit the implementation of the present disclosure described and/or required herein.

As shown in FIG. 10, the device 1000 includes a computing unit 1001, which may execute various appropriate actions and processing according to a computer program stored in a read only memory (ROM) 1002 or a computer program loaded from a storage unit 1008 into a random access memory (RAM) 1003. Various programs and data required for the operation of the device 1000 may also be stored in the RAM 1003. The computing unit 1001, the ROM 1002 and the RAM 1003 are connected to each other through a bus 1004. An input/output (I/O) interface 1005 is also connected to the bus 1004.

The I/O interface 1005 is connected to a plurality of components of the device 1000, including: an input unit 1006, such as a keyboard, a mouse, etc.; an output unit 1007, such as various types of displays, speakers, etc.; a storage unit 1008, such as a magnetic disk, an optical disk, etc.; and a communication unit 1009, such as a network card, a modem, a wireless communication transceiver, etc. The communication unit 1009 allows the device 1000 to exchange information/data with other devices through the computer network such as the Internet and/or various telecommunication networks.

The computing unit 1001 may be various general-purpose and/or special-purpose processing components with processing and computing capabilities. Some examples of computing unit 1001 include, but are not limited to, central processing unit (CPU), graphics processing unit (GPU), various dedicated artificial intelligence (AI) computing chips, various processors that run machine learning model algorithms, digital signal processing DSP and any appropriate processor, controller, microcontroller, etc. The computing unit 1001 executes the various methods and processes described above, such as the method of generating a content based on a large model. For example, in some embodiments, the method of generating a content based on a large model may be implemented as computer software programs, which are tangibly contained in the machine-readable medium, such as the storage unit 1008. In some embodiments, part or all of the computer program may be loaded and/or installed on the device 1000 via the ROM 1002 and/or the communication unit 1009. When the computer program is loaded into the RAM 1003 and executed by the computing unit 1001, one or more steps of the method of generating a content based on a large model described above may be executed. Alternatively, in other embodiments, the computing unit 1001 may be configured to execute the method of generating a content based on a large model in any other suitable manner (for example, by means of firmware).

Various implementations of the systems and technologies described in the present disclosure may be implemented in digital electronic circuit systems, integrated circuit systems, field programmable gate arrays (FPGA), application specific integrated circuits (ASIC), application-specific standard products (ASSP), system-on-chip SOC, load programmable logic device (CPLD), computer hardware, firmware, software and/or their combination. The various implementations may include: being implemented in one or more computer programs, the one or more computer programs may be executed and/or interpreted on a programmable system including at least one programmable processor, the programmable processor may be a dedicated or general programmable processor. The programmable processor may receive data and instructions from a storage system, at least one input device and at least one output device, and the programmable processor transmit data and instructions to the storage system, the at least one input device and the at least one output device.

The program code used to implement the method of the present disclosure may be written in any combination of one or more programming languages. The program codes may be provided to the processors or controllers of general-purpose computers, special-purpose computers or other programmable data processing devices, so that the program code enables the functions/operations specific in the flowcharts and/or block diagrams to be implemented when the program code executed by a processor or controller. The program code may be executed entirely on the machine, partly executed on the machine, partly executed on the machine and partly executed on the remote machine as an independent software package, or entirely executed on the remote machine or server.

In the context of the present disclosure, the machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage media would include electrical connections based on one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device or any suitable combination of the above-mentioned content.

In order to provide interaction with users, the systems and techniques described here may be implemented on a computer, the computer includes: a display device (for example, a CRT (cathode ray tube) or LCD (liquid crystal display) monitor) for displaying information to the user; and a keyboard and a pointing device (for example, a mouse or trackball). The user may provide input to the computer through the keyboard and the pointing device. Other types of devices may also be used to provide interaction with users. For example, the feedback provided to the user may be any form of sensory feedback (for example, visual feedback, auditory feedback or tactile feedback); and any form (including sound input, voice input, or tactile input) may be used to receive input from the user.

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation of the system and technology described herein), or in a computing system including any combination of such back-end components, middleware components or front-end components. The components of the system may be connected to each other through any form or medium of digital data communication (for example, a communication network). Examples of communication networks include: local region network (LAN), wide region network (WAN) and the Internet.

The computer system may include a client and a server. The client and the server are generally far away from each other and usually interact through the communication network. The relationship between the client and the server is generated by computer programs that run on the respective computers and have a client-server relationship with each other.

It should be understood that the various forms of processes shown above may be used to reorder, add or delete steps. For example, the steps described in the present disclosure may be executed in parallel, sequentially or in a different order, as long as the desired result of the present disclosure may be achieved, which is not limited herein.

The above-mentioned specific implementations do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method of generating a content based on a large model, comprising:
- performing an intention recognition on an input information in response to receiving the input information;
- generating a painting knowledge text by invoking a multimodal large model based on an intention for painting knowledge acquisition in response to recognizing the intention for painting knowledge acquisition from the input information;
- generating a first driving voice and a first action instruction for driving a virtual character according to the painting knowledge text; and
- broadcasting the painting knowledge text by driving the virtual character according to the first driving voice and the first action instruction, and driving the virtual character to generate expressions and actions corresponding to the painting knowledge text in a display interface of a digital human interaction terminal,
- wherein the input information comprises an input voice; the performing an intention recognition on an input information in response to receiving the input information comprises:
- converting the input voice into an input text; and
- performing the intention recognition on the input text by using a text classifier to classify the input text into one of the intention for painting knowledge acquisition, an intention for painting image generation, and an intention for painting knowledge retrieval.

2. The method according to claim 1, wherein the intention for painting knowledge acquisition comprises an intention for painting learning and an intention for painting comment; the multimodal large model comprises at least one of a painting teaching large model and a painting comment large model; and the generating a painting knowledge text by invoking a multimodal large model based on an intention for painting knowledge acquisition in response to recognizing the intention for painting knowledge acquisition from the input information comprises:
- generating a painting teaching text by invoking the painting teaching large model in response to the intention for painting knowledge acquisition being the intention for painting learning; and
- generating a painting comment text by invoking the painting comment large model in response to the intention for painting knowledge acquisition being the intention for painting comment.

3. The method according to claim 2, wherein the generating a painting teaching text by invoking the painting teaching large model in response to the intention for painting knowledge acquisition being the intention for painting learning comprises:
- analyzing the intention for painting learning, so as to determine that the intention for painting learning is one of a basic painting knowledge learning and a painting step learning; and
- generating one of a basic painting knowledge text and a painting step text by invoking the painting teaching large model according to one of the basic painting knowledge learning and the painting step learning.

4. The method according to claim 2, wherein the input information comprises a painting work; the generating a painting comment text by invoking the painting comment large model in response to the intention for painting knowledge acquisition being the intention for painting comment comprises:
- sending the input information and the painting work to the painting comment large model; and
- commenting on the painting work by using the painting comment large model to obtain the painting comment text.

5. The method according to claim 1, further comprising:
- generating a painting image by invoking the multimodal large model based on the intention for painting image generation in response to recognizing the intention for painting image generation from the input information.

6. The method according to claim 5, wherein the input information comprises a painting step information; the generating a painting image by invoking the multimodal large model based on the intention for painting image generation in response to recognizing the intention for painting image generation from the input information comprises:
- sending the painting step information to the multimodal large model; and
- generating the painting image by using the multimodal large model based on the painting step information.

7. The method according to claim 1, further comprising:
- retrieving a target knowledge text from a painting knowledge base in response to recognizing the intention for painting knowledge retrieval from the input information;
- generating a second driving voice and a second action instruction for driving the virtual character according to the target knowledge text; and
- broadcasting the target knowledge text by driving the virtual character according to the second driving voice and the second action instruction.

8. The method according to claim 1, wherein the intention for painting knowledge acquisition comprises an intention for painting learning and an intention for painting comment; the multimodal large model comprises at least one of a painting teaching large model and a painting comment large model; and the generating a painting knowledge text by invoking a multimodal large model based on an intention for painting knowledge acquisition in response to recognizing the intention for painting knowledge acquisition from the input information comprises:
- generating a painting teaching text by invoking the painting teaching large model in response to the intention for painting knowledge acquisition being the intention for painting learning; and
- generating a painting comment text by invoking the painting comment large model in response to the intention for painting knowledge acquisition being the intention for painting comment.

9. The method according to claim 8, wherein the generating a painting teaching text by invoking the painting teaching large model in response to the intention for painting knowledge acquisition being the intention for painting learning comprises:
- analyzing the intention for painting learning, so as to determine that the intention for painting learning is one of a basic painting knowledge learning and a painting step learning; and
- generating one of a basic painting knowledge text and a painting step text by invoking the painting teaching large model according to one of the basic painting knowledge learning and the painting step learning.

10. The method according to claim 8, wherein the input information comprises a painting work; the generating a painting comment text by invoking the painting comment large model in response to the intention for painting knowledge acquisition being the intention for painting comment comprises:

sending the input information and the painting work to the painting comment large model; and commenting on the painting work by using the painting comment large model to obtain the painting comment text.

11. An electronic device, comprising:

at least one processor; and a memory communicatively connected with the at least one processor;

wherein the memory stores instructions executable by the at least one processor, and the instructions, when executed by the at least one processor, cause the at least one processor to:

perform an intention recognition on an input information in response to receiving the input information;

generate a painting knowledge text by invoking a multimodal large model based on an intention for painting knowledge acquisition in response to recognizing the intention for painting knowledge acquisition from the input information;

generate a first driving voice and a first action instruction for driving a virtual character according to the painting knowledge text; and broadcast the painting knowledge text by driving the virtual character according to the first driving voice and the first action instruction, and drive the virtual character to generate expressions and actions corresponding to the painting knowledge text in a display interface of a digital human interaction terminal, wherein the input information comprises an input voice; and the at least one processor is further configured to:

convert the input voice into an input text; and perform the intention recognition on the input text by using a text classifier to classify the input text into one of the intention for painting knowledge acquisition, an intention for painting image generation, and an intention for painting knowledge retrieval.

12. The electronic device according to claim 11, wherein the intention for painting knowledge acquisition comprises an intention for painting learning and an intention for painting comment; the multimodal large model comprises at least one of a painting teaching large model and a painting comment large model; and the at least one processor is further configured to:

generate a painting teaching text by invoking the painting teaching large model in response to the intention for painting knowledge acquisition being the intention for painting learning; and generate a painting comment text by invoking the painting comment large model in response to the intention for painting knowledge acquisition being the intention for painting comment.

13. The electronic device according to claim 12, wherein the at least one processor is further configured to:

analyze the intention for painting learning, so as to determine that the intention for painting learning is one of a basic painting knowledge learning and a painting step learning; and generate one of a basic painting knowledge text and a painting step text by invoking the painting teaching large model according to one of the basic painting knowledge learning and the painting step learning.

14. The electronic device according to claim 12, wherein the input information comprises a painting work; and the at least one processor is further configured to:

send the input information and the painting work to the painting comment large model; and comment on the painting work by using the painting comment large model to obtain the painting comment text.

15. The electronic device according to claim 11, wherein the at least one processor is further configured to:

generate a painting image by invoking the multimodal large model based on the intention for painting image generation in response to recognizing the intention for painting image generation from the input information.

16. The electronic device according to claim 15, wherein the input information comprises a painting step information; and the at least one processor is further configured to:

send the painting step information to the multimodal large model; and generate the painting image by using the multimodal large model based on the painting step information.

17. The electronic device according to claim 11, wherein the at least one processor is further configured to:

retrieve a target knowledge text from a painting knowledge base in response to recognizing the intention for painting knowledge retrieval from the input information;

generate a second driving voice and a second action instruction for driving the virtual character according to the target knowledge text; and broadcast the target knowledge text by driving the virtual character according to the second driving voice and the second action instruction.

18. A non-transitory computer-readable storage medium storing computer instructions, wherein the computer instructions are configured to cause a computer to:

perform an intention recognition on an input information in response to receiving the input information;

generate a painting knowledge text by invoking a multimodal large model based on an intention for painting knowledge acquisition in response to recognizing the intention for painting knowledge acquisition from the input information;

generate a first driving voice and a first action instruction for driving a virtual character according to the painting knowledge text; and broadcast the painting knowledge text by driving the virtual character according to the first driving voice and the first action instruction, and drive the virtual character to generate expressions and actions corresponding to the painting knowledge text in a display interface of a digital human interaction terminal, wherein the input information comprises an input voice; and the computer instructions are further configured to cause the computer to:

convert the input voice into an input text; and perform the intention recognition on the input text by using a text classifier to classify the input text into one of the intention for painting knowledge acquisition, an intention for painting image generation, and an intention for painting knowledge retrieval.

19. The method of claim 1, wherein generating the first action instruction comprises:

extracting semantic features from the painting knowledge text, the semantic features including at least one of emotion, emphasis and gesture cues; and mapping the semantic features to animation control parameters of the virtual character to generate the expressions and actions corresponding to the painting knowledge text.

20. The method of claim 1, further comprising:

selecting, based on the classified intention, one of a plurality of specialized models including a painting teaching model, a painting image generation model, and a painting knowledge retrieval model, and processing the input information using the selected model to generate the painting knowledge text or a painting image.

* * * * *